July 5, 1927.
S. J. BENS
1,634,645
LINK JOINT FOR CHAINS
Original Filed April 23, 1921   2 Sheets-Sheet 1
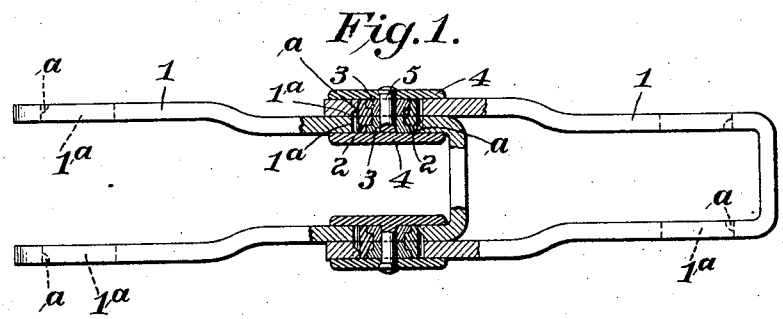
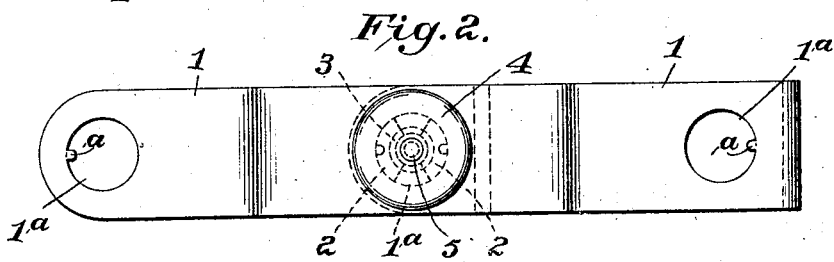
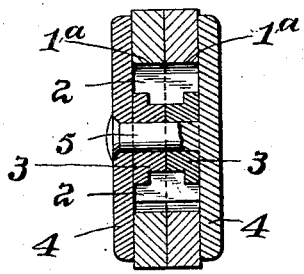 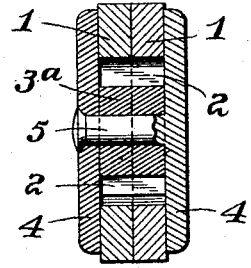
 
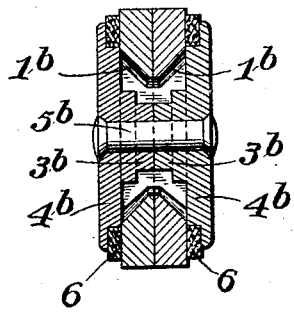 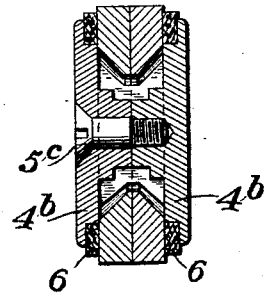
Inventor:
Samuel J. Bens,
By Spear Middleton Donaldson & Hall
Attorneys July 5, 1927.
S. J. BENS
1,634,645
LINK JOINT FOR CHAINS
Original Filed April 23, 1921   2 Sheets-Sheet 2
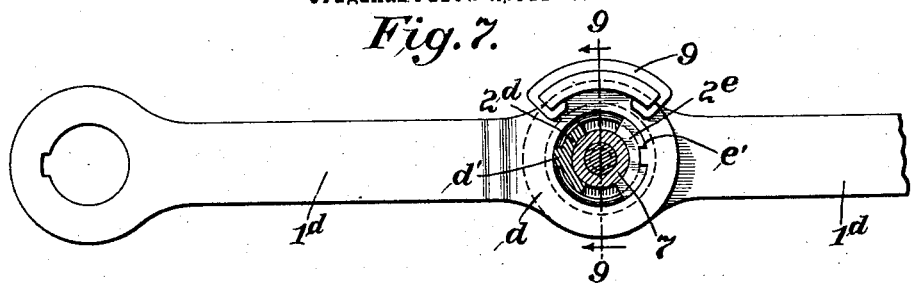
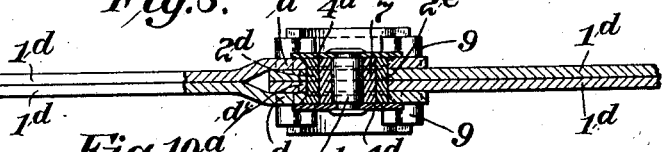
  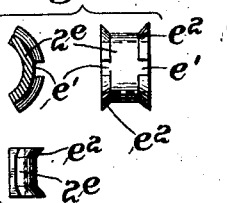  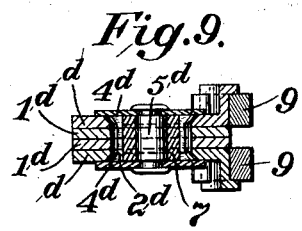
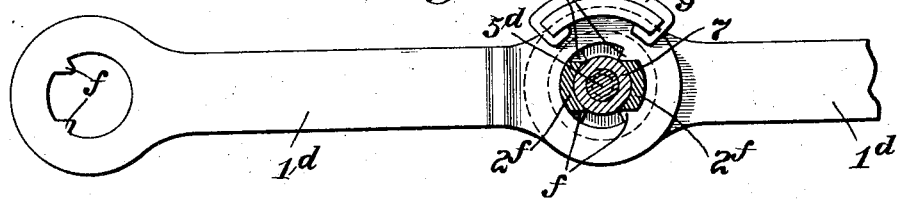
  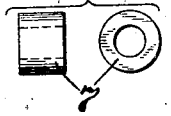  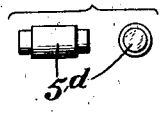  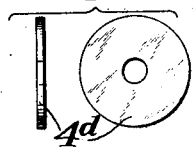
Inventor:
Samuel J. Bens,
By *Shea Middleton Donaldson & Hall*
Attorneys Patented July 5, 1927.

1,634,645

UNITED STATES PATENT OFFICE.

SAMUEL J. BENS, OF NEW YORK, N. Y., ASSIGNOR TO CHAIN SAW CORPORATION, OF WILMINGTON, DELAWARE, A CORPORATION OF DELAWARE.

LINK JOINT FOR CHAINS.

Substitute for application Serial No. 463,833, filed April 23, 1921. This application filed November 16, 1926. Serial No. 148,762.

My said invention relates more particularly to the link joints for chains for connecting the individual links with each other.

The invention has among its objects to provide a pivot joint which will be strong and durable and in which the wear on the parts will be reduced to a minimum, due to the use of hardened metal parts to receive the wear and the provision of effective lubricating means.

The invention includes the novel features of construction and arrangement and combination of parts hereinafter described and particularly defined by the appended claims.

In order that the invention may be more readily understood, I have appended hereto a drawing illustrating the same in which:—

Fig. 1 is a sectional plan view of two connected links forming part of a chain.

Fig. 2 is a side elevation of the same.

Fig. 3 is an enlarged vertical transverse section through the axis of the pivot joint.

Fig. 4 is a detail transverse sectional view of a modification, and

Figs. 5 and 6 are transverse sectional views of further modifications.

Fig. 7 is a side elevation, partly in section showing my invention embodied in a modified form of chain.

Fig. 8 is an edge view of the same, partly in horizontal section.

Fig. 9 is a transverse sectional view on line 9—9 of Fig. 7.

Figs. 10 and 10$^a$ are detail views of the two bushings used in the chain shown in Figs. 7, 8 and 9.

Figs. 11 and 12 are respectively a sectional elevation and a sectional plan of a further modification and Figs. 13 to 16 are detail views.

Referring by reference characters to this drawing, the two chain links, which may be of the ordinary or any desired construction, are designated by the numerals 1, 1, these being shown as of U-shape having overlapping parts connected by my improved joints. These overlapping parts are provided with circular aligned openings 1$^a$, the walls of which may be cylindrical as shown in Figs. 1 to 3 and within which are placed a pair of arc shaped bearing bushings of hardened steel as indicated at 2, 2.

These bushings are made of a thickness corresponding to the thickness of the two overlapping links and their peripheries bear against the walls of the recesses, being held in contact therewith by the inner bushing 3, of hardened steel, which, in the form shown in Figs. 1 to 3 is made in two parts which are countersunk into the arc shaped bushings from opposite sides. The countersinking is preferably secured by providing the arc shaped bushings with rebates as shown in Fig. 3 in which rebates the annular flanges of the bushings 3 rest. The parts are held in position by side plates or discs 4 which overlie the two sets of bushings and the adjacent portions of the links, which plates are connected together by suitable means such as a connecting member 5.

As the bushing 3 is of hardened steel the rivet receives no wear and hence may be of soft metal without affecting the durability of the chain.

The bushings are held properly spaced in action by integral ribs or projections "$a$" on the links engaging corresponding recesses in the bushings whereby the bushings are prevented from shifting around into contact with each other.

The rivet may, if desired, be formed as an integral part of one of the plates or discs 4, passed through an opening in the other plate and headed over or upset thereon, as shown in Fig. 3; in which event the plates would, of course, also be made of soft metal. The spaces between the arc-shaped bushings form lubricant pockets which are closed to retain the lubricant by the side plates 4.

Instead of making the bushing 3 of two parts as shown in Fig. 3, I may make it of a single cylindrical piece of hardened steel as indicated at 3$^a$, Fig. 4, in which event the rebates in the inner faces of the arc-shaped bushings would be omitted.

If desired, the aligning openings in the overlapping portions of the links may be reversely flared as indicated at 1$^b$, Fig. 5, and the arc-shaped bushings provided with peripheral V-shaped grooves to correspond, in which event said arc-shaped bushings are relied on to hold the links in juxtaposition.

In this form I have shown how the inner bushing parts (which correspond to the elements 3, 3 of Fig. 3) may be made integral with the side plates 4$^b$ as indicated at 3$^b$.

In this form the connecting element 5$^b$ is formed as an independent rivet headed over or upset at opposite ends. In this form also I have shown how the edges of the discs 4$^b$ may be provided with annular rebates to receive packing rings 6 of suitable material to more effectually retain the lubricant.

Instead of using a rivet to connect the combined plate and bushing members as in Fig. 5, I may use a screw 5$^c$ as shown in Fig. 6.

In Figs. 7, 8 and 9 I have shown a different type of chain of narrow form, each link being composed of juxtaposed plates 1$^d$ conveniently of sheet metal having forked or separated portions $d$ to receive between them the cooperating end of the next adjoining link.

The overlying portions of the links are provided with aligning openings to receive the bushings and rivets, the bushings being shown at 2$^d$ and 2$^e$ and the rivet at 5$^d$, a cylindrical sleeve or wear receiving bushing 7 being interposed between the rivet and arc shaped bushings, the parts being confined in place by the side plates or washers 4$^d$. The bushing 2$^d$ is provided with an integral projection $d'$ designed to engage a corresponding recess in the abutting portion of the corresponding link and the bushing 2$^e$ is provided with a recess $e'$ designed to be engaged by projections on the forked portion of the adjacent link.

The bushings are provided with beveled flanges $d^2$ and $e^2$ and the openings in the walls of the links are correspondingly beveled.

In the form shown in Figures 11 to 16 inclusive I make the openings in the link walls cylindrical and omit the beveled flanges from the bushings, making these of the shape of the segment of a plain cylinder as indicated at 2$^f$, Fig. 13. In this form each link portion has two projections $f$ designed to abut against opposite ends of the bushing as shown in Fig. 11. The cylindrical sleeves, rivets and washers or side plates for both the forms shown in Figs. 7 and 8, and 11 and 12, are shown in detail in Figs. 13, 14, 15 and 16 respectively.

The links may be provided with outwardly turned or enlarged portions to receive wear plates 9 to engage the sprocket teeth.

As will be evident to those skilled in the art, my invention permits of various modifications without departing from the spirit thereof or the scope of the appended claims.

This application is based upon my application No. 463,833, filed April 23, 1921, allowed November 2, 1922, and now held among the abandoned files.

Having thus described my invention, what I claim is:

1. In a link belt or chain joint, a pair of overlapping links having aligning openings, a pair of arc-shaped bushings within the openings, a wear receiving bushing between said arc-shaped bushings and side plates connected together and overlapping said bushings and links.

2. In a link belt or chain joint, a pair of overlapping links having aligning openings, a pair of arc-shaped bushings within the openings, a two-part wear receiving bushing between the arc-shaped bushings and having outer parts countersunk into the same, and connected side plates overlapping said bushings and the adjacent portions of the chain links and closing the space between said arc-shaped bushings.

3. In a link belt or chain joint, a pair of overlapping links having aligning openings, a pair of arc-shaped bushings within the openings, a two-part wear receiving bushing between the arc-shaped bushings, having outer portions countersunk into said arc-shaped bushings, side plates overlapping said bushings and the adjacent portions of the chain links, and a rivet integral with one of said plates and engaging the other plate for holding them together.

4. In a link belt or chain joint, a pair of overlapping links having aligning openings, a pair of arc-shaped bushings within the openings, a wear receiving bushing between said arc-shaped bushing and side plates connected together and overlapping said bushings and links, said side plates having annular recesses, and packing rings inserted in said recesses and bearing against the outer faces of the chain links.

In testimony whereof, I affix my signature.

SAMUEL J. BENS.